United States Patent [19]

Yasuhara

[11] Patent Number: 4,594,667
[45] Date of Patent: Jun. 10, 1986

[54] DIGITAL CONTROL SYSTEM

[75] Inventor: Seishi Yasuhara, Yokosuka, Japan

[73] Assignee: Nissan Motor Company, Limited, Yokohama, Japan

[21] Appl. No.: 574,748

[22] Filed: Jan. 30, 1984

[30] Foreign Application Priority Data

Feb. 10, 1983 [JP]  Japan ................................. 58-21059

[51] Int. Cl.$^4$ ..................... F02M 25/06; F02D 5/00
[52] U.S. Cl. .................... 364/431.06; 364/431.04; 123/571
[58] Field of Search ................ 364/431.06, 431.12, 364/200, 900; 123/571

[56] References Cited

U.S. PATENT DOCUMENTS

| | | | |
|---|---|---|---|
| 3,350,691 | 10/1967 | Faulis et al. | 364/900 |
| 3,602,895 | 8/1971 | Loizides | 364/900 |
| 4,107,717 | 8/1978 | Klotzner et al. | 364/431.12 |
| 4,388,912 | 6/1983 | Kimura et al. | |
| 4,432,330 | 2/1984 | Otsuka | 364/431.12 |
| 4,445,170 | 4/1984 | Hughes et al. | 364/200 |
| 4,473,056 | 9/1984 | Ishida et al. | 364/431.06 |

FOREIGN PATENT DOCUMENTS 51-67831 6/1976 Japan .

OTHER PUBLICATIONS

"Auxiliary Input/Output Processor Using Shared Storage and a Uniform Instruction Set", by P. Giangarra et al, IBM Tech. Disclosure Bulletin, pp. 4719-4721, Feb. 83.

Primary Examiner—Parshotam S. Lall
Attorney, Agent, or Firm—Schwartz, Jeffery, Schwaab, Mack, Blumenthal & Evans

[57] ABSTRACT

A digital control system for controlling a controlled object according to the measured value of a controlled variable, wherein there are provided a memory having a plurality of addresses, each comprising at least two bits in which at least two instructions are stored, and control means which reads the measured controlled variable, accesses one of the addresses according to the read controlled variable, and fetches the predetermined instruction from the bit string in the accessed address.

8 Claims, 6 Drawing Figures

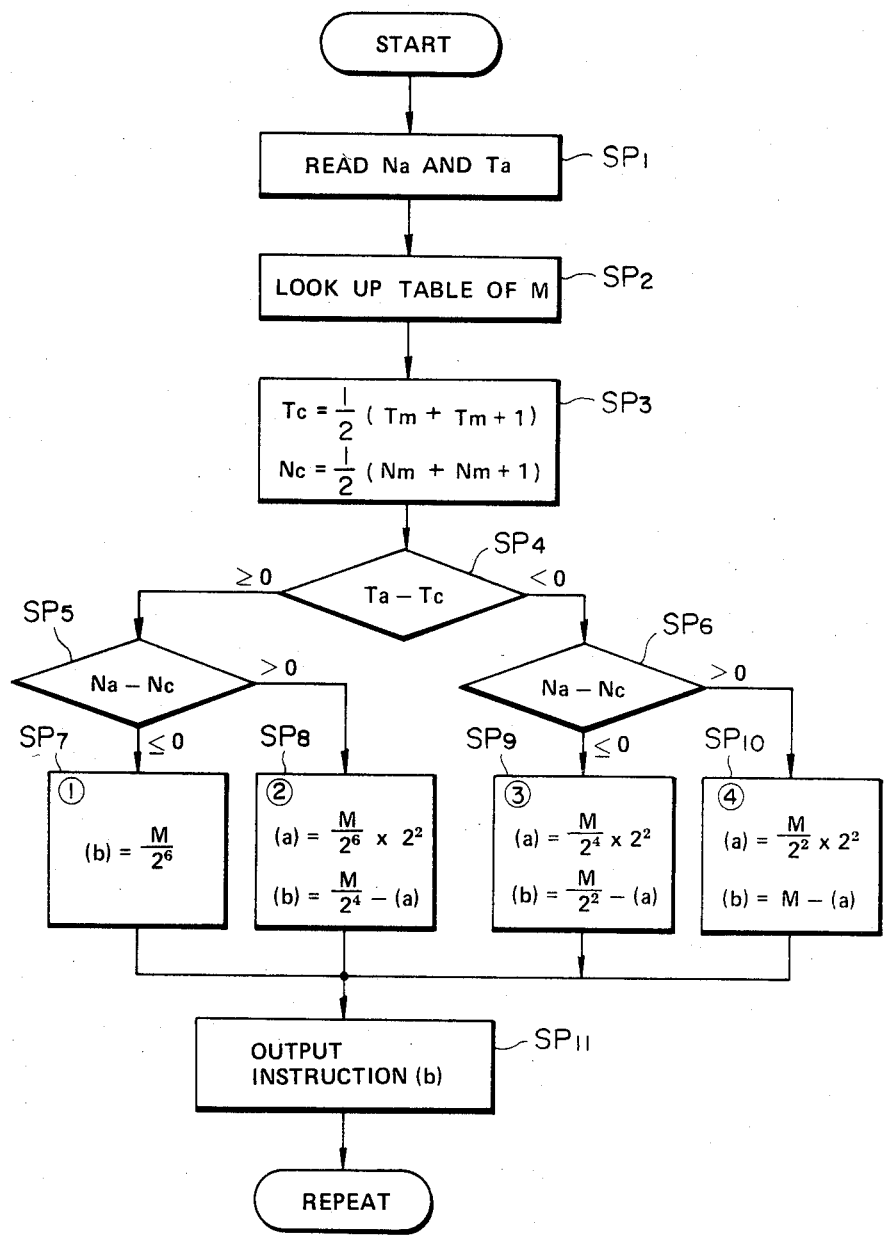

DIGITAL CONTROL SYSTEM

BACKGROUND OF THE INVENTION

1. Field of the Invention

The present invention relates generally to a digital control system which reads instructions one at a time from a memory table previously stored in a semiconductor memory in order to obtain instructions to be given to a sensed control object on the basis of controlled variables.

2. Description of the Prior Art

Recently, microcomputers have been used increasingly to digitally control various kinds of equipment. Such digital control systems using microcomputers have been put to practical uses including custom appliances. Conventional digital control systems employ a table look-up method to retrieve instructions stored in a memory. In more detail, a control unit of the system reads one of the instructions previously stored in a Read-Only Memory (ROM) according to a detected value (a predetermined physical variable related to the controlled object) and controls the controlled object in accordance with the contents of the read instruction.

Since digital control systems of this type are capable of performing high speed processing, they can be advantageously applied to controlled objects which require extremely fast response, e.g., for fuel injection amount control and spark timing control of an internal combustion engine, etc., as seen in Japanese Publication No. 51-67831.

FIG. 1 shows a memory table for controlling an engine. In FIG. 1, the X-axis represents engine revolutions per minute (RPM). Individual values of engine revolutions per minute $N_1 \ldots N_i$ are arranged along the X-axis at equal intervals. On the other hand, the Y-axis represents engine torque (load). Individual values of torque $T_1 \ldots T_I$ are arranged along the Y-axis at equal intervals. Consequently, a plurality of matrix cells is formed. An instruction in the form of a binary representation of, e.g., fuel injection amount, is stored within an address Ad (Nx, Ty) represented by the point of intersection between adjacent matrix cells. The number of bits in the binary representation should conform to that of the Central Processing Unit (CPU) of the microcomputer.

The Central Processing Unit detects and reads the engine revolution Na and torque Ta values via a plurality of sensors, specifies an address according to the detected values, Na, Ta to read its contents, i.e., a predetermined instruction. It should be noted that usually the actual values Na, Ta will coincide exactly with the cell values $N_1, N_2 \ldots, N_I$ or $T_1, T_2, \ldots, T_I$ but rather will be between pairs thereof. To cope with this situation, there are various techniques to approximate the corresponding address. For example, the address of the desired intersection can be determined simply by rounding fractions up, i.e. by taking the upper and rightward boundary of the target cell, or by truncating fractions, i.e. taking the nearest downward and leftward values. As an alternative, the instructions read from the four addresses surrounding the intersection of the actual values (Na, Ta) may be averaged according to the positional relationship of the intersections of the matrix cells to obtain a weighted average.

In either case, since in a control system employing a table look-up method, a predetermined instruction can be obtained by simply specifying an address, high-speed processing is possible and the desired control can be performed in cases when it is difficult to express the detected values and instructions in terms of functional relationships.

However, since the number of addresses increases with the total number of instructions, the memory capacity must be increased in order to improve control accuracy. Especially in engine control systems, to match individual engines specifications, a programmable ROM (PROM) is used in place of a relatively inexpensive mask ROM in order to allow the contents of memory to be changed after installation into the control system, so that the overall cost of the control system is increased.

In addition, memory capacity may be wasted depending on the contents of the control data. For example, if there are sixteen kinds of instructions, all of the instructions can be expressed in a four-bit binary representation since $16 = 2^4$. In this case, supposing that a group of binary digits operated upon as a unit is an 8-bit byte, each instruction must be stored within the ROM and/or PROM in the form of an 8-bit binary representation, thus requiring an unnecessarily large memory capacity.

SUMMARY OF THE INVENTION

With the above-described problems in mind, it is an object of the present invention to provide a digital control system for controlling a controlled object such as an engine wherein a plurality of instructions are stored at a single address and only the desired predetermined instruction is fetched from the address, whereby the memory can be utilized more effectively and its capacity can be saved.

This can be achieved by providing a memory table comprising a plurality of predetermined addresses, each predetermined address storing a numerical value of an N-bit binary representation, the N-bit binary representation containing at least two n-bit control instructions ($n \leq N/2$), and control means which fetches only the control instruction from the address specified by the measured value of at least one predetermined controlled variable from the portion of the address closer to the detected controlled variable.

The kinds of control instructions K can be expressed as: $K \leq 2^n$. In this way, the control system according to the present invention is so constructed that the relationship among the kinds of control instructions K, the number of bits n required for distinguishing each control instruction, and the number of bits N stored in a single address satisfies the following conditions $K \leq 2^n$ and $n \leq N/2$.

BRIEF DESCRIPTION OF THE DRAWINGS

A more complete understanding of the present invention will be obtained from the following detailed description taken in conjunction with the drawings in which:

FIG. 4 is a flowchart of an operating procedure of a control unit in the above-described preferred embodiment;

DETAILED DESCRIPTION OF THE PREFERRED EMBODIMENTS

Reference will hereinafter be made to the attached drawings in order to facilitate understanding of the present invention.

A preferred embodiment of an EGR (Exhaust Gas Recirculation) control system for a Diesel Engine to which the present invention is applicable will be described in detail.

EGR (Exhaust Gas Recirculation) means circulation of part of engine exhaust gas to an intake air passage in order to suppress the maximum fuel-combustion temperature and pressure, thus reducing the amount of nitrousoxides (NOx) produced in the combustion stroke of each engine cylinder.

Figure 2:
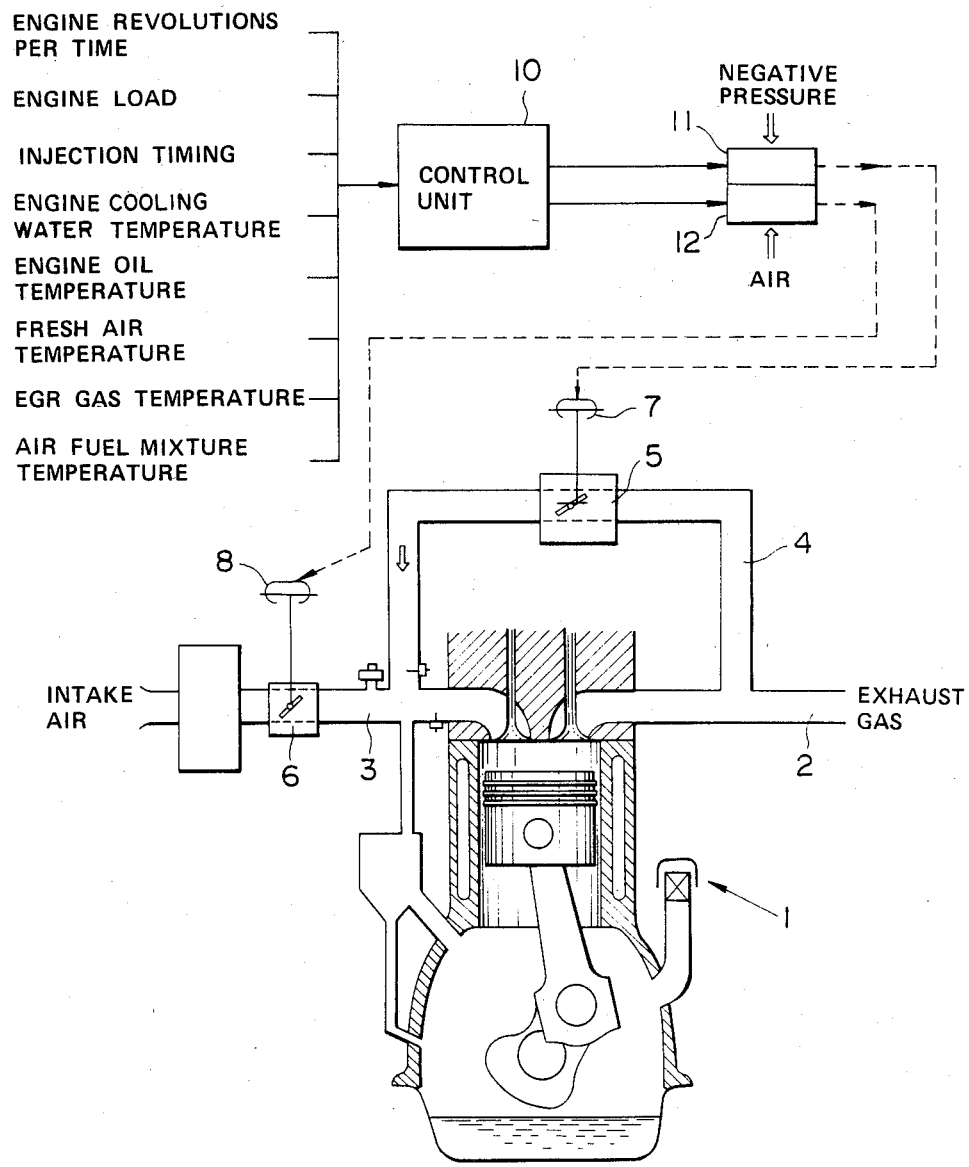
FIG. 2 is a diagram of an Engine Gas Recirculation (EGR) system showing a preferred embodiment to which the present invention is applied.

As shown in FIG. 2, an EGR passage 4 is provided so as to communicate between exhaust gas passage 2 and intake air passage 3. An EGR control valve 5 is inserted at an intermediate point along the EGR passage 4 and an intake air throttle valve 6 is installed within the intake air passage 3 at a point upstream of the exit of the EGR passage 4. The intake air throttle valve 6 and EGR control valve 5 are both actuated between fully-open and half-open positions by means of diaphragm actuators 7, 8, thus varying the amount of EGR. It is noted that other positions, such as a fully closed position, may also be used if desired.

The two diaphragm actuators 7, 8 receive a negative pressure from a negative pressure source or atmospheric pressure selectively via three-way electromagnetic valves 11, 12 operated in response to signals from the control system 10 in such a way that when the electromagnetic valves 11, 12 are turned OFF, the atmospheric pressure is supplied to the respective actuators 7, 8, and the EGR control valve 5 and throttle valve 6 are held opened by the elastic forces of return springs (not shown). On the other hand, when the electromagnetic valves 11, 12 are turned ON, negative pressure is supplied to the respective actuators 7, 8, and the EGR control valve 5 and throttle valve 6 are held in their half open positions against the elastic forces of the respective return springs (not shown).

When the intake air throttle valve 6 is half open, the amount or percentage of EGR is relatively large since a strong negative pressure is produced downstream of the throttle valve 6. In this state, the maximum amount of exhaust gas is recirculated when the EGR control valve 5 is wide-open and a moderate amount of exhaust gas is recirculated when the EGR control valve 5 is half-open. On the other hand, when the throttle valve 6 is opened, the intake air passage 3 approximates atmospheric pressure so that the EGR amount is relatively low. In this state, a small amount of flow is recirculated when the EGR control valve 5 is opened and substantially no exhaust gas is recirculated (Exhaust Recirculation Stop) when the EGR control valve 5 is half-open.

Therefore, engine control by which the production of NOx can be suppressed without damaging the drivability of the engine is possible by selecting one of the above-described possible states according to engine operating conditions. To achieve control according to the engine operating conditions, the control unit 10 basically detects instantaneous engine revolution speed N and engine load T and controls the energization of the electromagnetic valves 11, 12 according to a predetermined procedure. It should be noted that although corrections or adjustments of the degree of control are made on the basis of the actual EGR percentage derived from the air-fuel mixture temperature, EGR gas temperature, and intake air temperature, cooling air temperature, and lubricating oil temperature, etc., a detailed description of such corrections will be omitted since there is no direct relationship to the present invention.

The control unit 10 comprises the conventional elements of a microcomputer, i.e., an I/O interface which interfaces the detected signals from various sensors and an output signal to the electromagnetic valves 11, 12, a memory (ROM) which stores control data and instructions, and a CPU (Central Processing Unit) which executes control operations, sending or receiving signals to or from the I/O interface and memory. The present invention has the feature that the CPU carries out the fetching of one of a plurality of instructions according to the detected values, with a plurality of instructions stored within a preselected address or each of a number of preselected addresses.

Table 1 below shows the control states of the engine EGR control as described above. The control states can be represented by a two-bit binary number since there are only four possible combinations of the open and half-open states of the EGR control valve 5 and intake air throttle valve 6. In Table 1, A through D are mnemonics for expressing more simply the contents of the instructions.

TABLE 1

| EGR percentage | EGR device | | Instructions | |
| | Throttle valve 6 | EGR control valve 5 | Binary | Nominal |
| --- | --- | --- | --- | --- |
| Large | half open | Opened | (11) | A |
| Medium | half open | half open | (10) | B |
| Small | Opened | Opened | (01) | C |
| Zero | Opened | half open | (00) | D |

In this way, all of the states can be represented by two-bit (n=2) binary numbers. Supposing that the basic unit upon which the CPU operates and the unit which can be stored in each of the addresses of the memory comprises eight bits (N=8), this means that four separate instructions can be stored in the same memory cell. For example, the eight-bit binary representation M=A D B C=11 00 10 01 can be stored in one address. It should be noted when the above-described M is stored in the address, a numerical value $(C\ 9)_{16}$ is actually stored in the address of the memory as machine language data since the value M is not artificially maintained as four two bit binary representations.

On the other hand, the CPU can fetch a predetermined two-bit binary instruction from the above-described eight-bit binary machine data stored in the address.

The operational sequence of the CPU will now be described with reference to FIGS. 3 and 4.

In the first step $SP_1$ of FIG. 4, the CPU reads the instantaneous engine revolution speed Na and load Ta from the engine revolution sensor and the accelerator opening sensor respectively via the I/O interface. In a second step $SP_2$, the CPU executes a table look-up of the corresponding eight-bit binary value M from the memory table. In this case, if $Nm \leq Na < Nm+1$ and $Tm \leq Na < Tm+1$, the contents of the address (Nm, Tm) would be fetched as the value M as can be appreciated from FIG. 3.

Next, the CPU derives a positional relationship of the point Na, Ta within the matrix corresponding to the address Ad (Nm, Tm). In detail, in a third step SP$_3$, the average values Nc, Tc of Nm and Nm+1 and of Tm and Tm+1 are calculated $$\left( Nc = \frac{Nm + Nm + 1}{2}, Tc = \frac{Tm + Tm + 1}{2} \right).$$

After the average value Tc is obtained in the third step SP$_3$, the CPU calculates the difference between Ta and Tc in a fourth step SP$_4$ (Ta-Tc) and calculates the difference between Na and Nc in fifth and sixth steps SP$_5$ and SP$_6$.

The above-described matrix region is partitioned into four cells (1) through (4) by the axes Nc and Tc. The cells (1) through (4) and the digit positions of the eight-bit binary value M correspond as shown in Table 2 and in FIG. 3.

TABLE 2

| Cell | Digit position (from MSB) | M |
|---|---|---|
| (1): $Nm \leq Na < Nc$ $Tm + 1 > Ta \geq Tc$ | 1.2 → Step SP$_7$ | A(11) |
| (2): $Nm + 1 > Na \geq Nc$ $Tm + 1 > Ta \geq Tc$ | 3.4 → Step SP$_8$ | D(00) |
| (3): $Nm \leq Na < Nc$ $Tm \leq Ta < Tc$ | 5.6 → Step SP$_9$ | B(10) |
| (4): $Nm + 1 > Na \geq Nc$ $Tm \leq Ta < Tc$ | 7.8 → Step SP$_{10}$ | C(01) |

Thereafter, the CPU executes a predetermined bit shift operation in the appropriate one of the seventh through tenth steps SP$_7$ through SP$_{10}$ according to which one of the cells the values of Na and ta belong so as to fetch the desired two-bit binary instruction.

Figure 1:
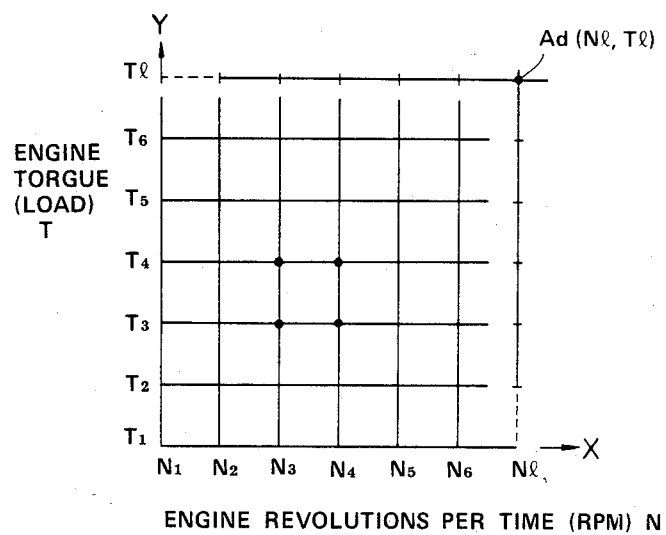
FIG. 1 is a general conceptual representation of a memory table.
Figure 3:
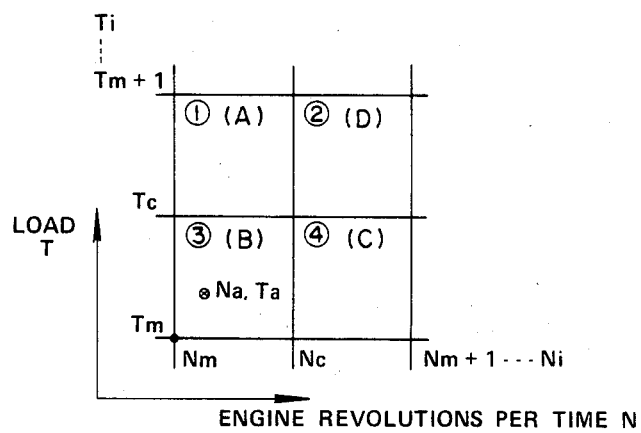
FIG. 3 is a conceptual diagram of a part of memory table in the above-described preferred embodiment.

Assuming that the values of Na and Ta belong to the third region (3) as shown in FIG. 3, the CPU fetches the two bits in the fifth and sixth positions of the eight-bit binary value M counting from the MSB (most significant bit) in the ninth step SP$_9$. In more detail, supposing that $M = A \cdot D \cdot B \cdot C = 11001001$, the shift operation can be expressed as follows:

$$\begin{aligned}
(a) &= (M/2^4) \times 2^2 \\
&= 00001100 \times 100 \\
&= 00110000 \\
(b) &= (M/2^2) - (a) \\
&= 00110010 - 00110000 \\
&= 00000010
\end{aligned}$$

Consequently, the required two-bit binary instruction B can be fetched. For the other cells (1), (2), and (4), the respectively required two-bit binary instructions A, D, and C can be fetched separately.

The control unit, i.e. CPU, sends the instruction (b) thus fetched to the electromagnetic valves 11, 12 in an eleventh step SP$_{11}$. The CPU thus ends one cycle of operation. Thereafter, the CPU repeats the above-described operation to control EGR rate according to instantaneous values of engine speed and torque.

In this embodiment, since the four instructions A, D, B, and C are stored in a single address as described above, the instruction capacity of each cell is quadrupled so that the memory capacity can be more fully utilized.

It should be noted that in the case where the CPU operates upon units of eight bits, two instructions, each having 16 possible states ($2^4 = 16$), can be combined into one address or the upper two bits of one address can be allocated to EGR instructions with the remaining lower six bits allocated to one instruction for fuel injection timing.

Furthermore, for example, if the data are so ordered that resolution is coarse for the engine speed and fine for the load, the 8-by-8 matrix structure can be changed to a 4-by-16 structure, for example, according to the required accuracy.

Figure 5:
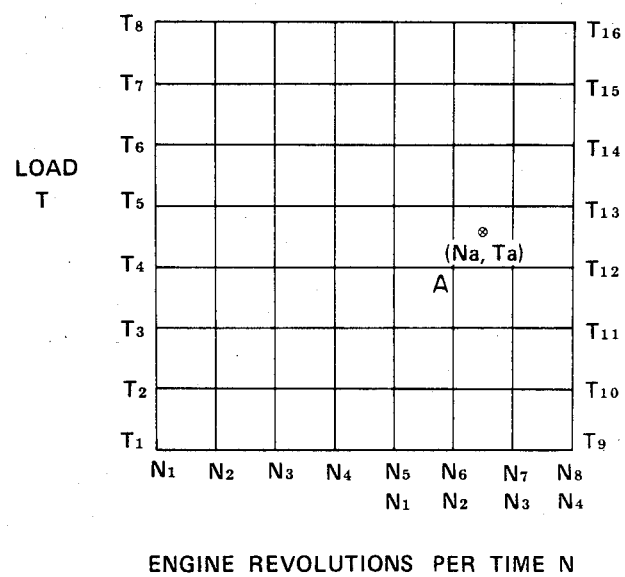
FIG. 5 is a conceptual diagram of a memory table of another preferred embodiment.
Figure 6:
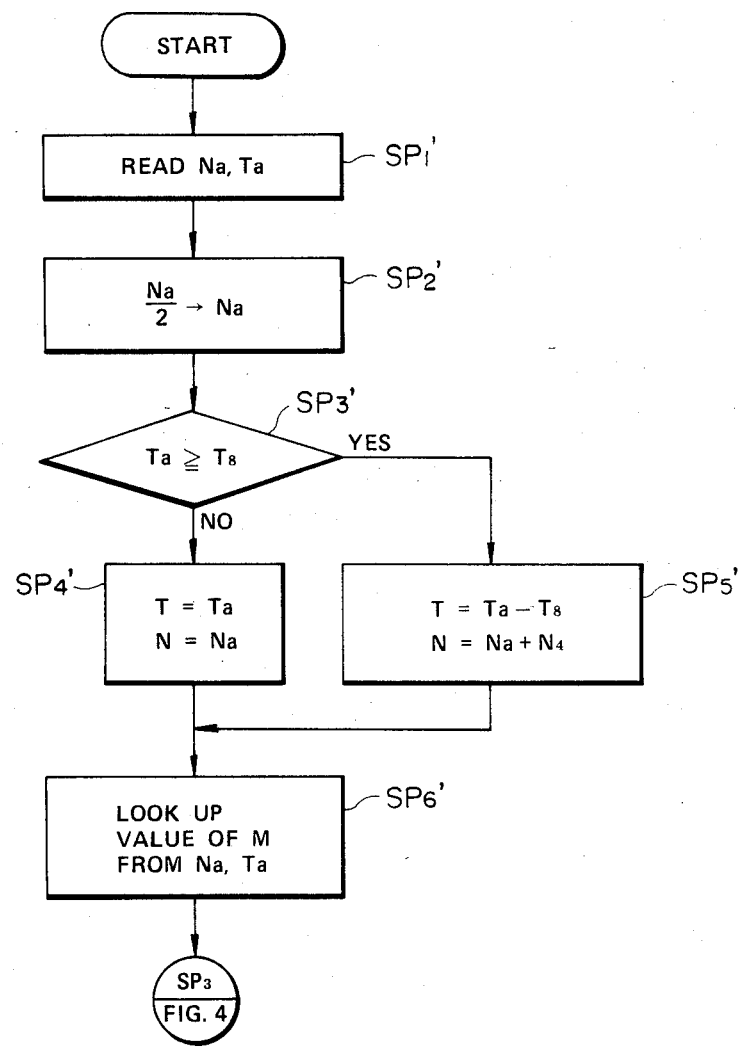
FIG. 6 is a flowchart of an essential part of an operating procedure in the second preferred embodiment of the control unit.

As shown in FIG. 5, the memory table is divided into two, i.e., into a left half comprising a 4-by-8 array of addresses allocated to $N = N_1$ through $N_4$ and $T = T_1$ through $T_8$ and into a right half comprising a 4-by-8 array of addresses allocated to $N = N_1$ through $N_4$ and $T = T_9$ through $T_{16}$. In this case, after reading the values Na and Ta in a step SP$_1'$ of FIG. 6, the value Na is divided by two in a step SP$_2'$. The step is representative of the fact that the N-axis has only half the scale of a normal, square ($8 \times 8$) array. Next, in a step SP$_3'$, the value of Ta is compared with a boundary value $T_8$. If $Ta \geq T_8$, the routine goes to a step SP$_5'$ wherein the coordinates Na, Ta are converted to the forms used in the table. For example, the coordinates ($N_2$, $T_{12}$) correspond to Ad ($N_5$, $T_4$) in the memory table and the coordinates ($N_4$, $T_{12}$) correspond to Ad ($N_6$, $T_4$). If $TA < T_8$, the routine goes to a step SP$_4'$ wherein the coordinates T and N are obtained without further processing. In a step SP$_6'$, the table look-up of value M is performed. Then the routine goes to the step SP$_3$ in FIG. 4.

As described above, since according to the present invention a plurality of instructions are stored in a single address and only a single desired instruction is fetched from the contents of the address according to the detected values by means of a predetermined shift operation, the memory capacity is extended substantially and can be most effectively utilized, thus reducing the cost of the control unit while improving resolution and accuracy.

It can be fully understood by those skilled in the art that the foregoing description is made in terms of preferred embodiments and various changes may be made without departing from the scope of the present invention, which is to be defined in the appended claims.

What is claimed is:

1. A digital control system for controlling a controlled object according to at least one controlled variable concerning the controlled object, comprising:
   (a) memory means having a plurality of memory addresses each address comprising N bits in which at least two instructions, each instruction comprising at least one bit, are stored, the number of instructions the satisfying equation $K \leq 2^n$, where K is the number of instructions, n is the number of bits per instruction, and $n \leq N/2$; and
   (b) control means which processes information in units of N bits, accesses one of the memory addresses according to the measured value of the detected controlled variable, fetches one of the instructions in the address according to said measured variable value, and outputs a command signal to the controlled object to perform a predetermined operation according to the contents of the fetched instruction.

2. The control system according to claim 1, wherein said control means fetches the predetermined instruction by means of a predetermined bit shift operation performed in accordance with the difference between the measured controlled variable and the closest one of a plurality of reference values of the variable, the accessed memory address corresponding to the closest reference value.

3. A digital control system for use in an engine control, comprising:

(a) at least two detection means which detect at least two engine operating parameters;

(b) memory means having a plurality of N-bit addresses, each address corresponding to the intersection between a row and a column of a matrix, the rows of the matrix corresponding to predetermined values of one of the engine operating parameters and the columns thereof corresponding to predetermined values of the other engine operating parameters, and storing a plurality of predetermined instructions represented as n-bit binary values so as to satisfy the following equation: $n \leq N/2$; and (c) control means which reads the detected engine operating parameters, accesses one of the addresses in said memory means according to the detected engine operating parameters, fetches one of the predetermined instructions from the accessed address according to a positional relationship between the accessed address and the combination of the two detected engine operating parameters, and outputs a signal to the engine to cause the latter to perform a predetermined operation according to the contents of the fetched instruction.

4. The digital control system according to claim 3, wherein said control means accesses one of the addresses in said memory means in such a manner that when the detected value of one of the engine operating parameters equals or is greater than one of the predetermined rows of the matrix and less than the next greater row and the detected value of the other engine operating parameter equals or is greater than one of the predetermined columns and less than the next greater column, said control means accesses the address corresponding to the intersection of the predetermined row and column.

5. The digital control system according to claim 4, wherein said control means fetches the predetermined instruction from the accessed address in such a manner that said control means fetches the predetermined instruction by performing one of a plurality of predetermined bit-shift operations which is selected depending on which of four matrix cells the intersection of the two detected engine operating parameters falls, the four matrix cells being defined by the rows and columns immediately less than and greater than the two detected engine operating parameters an additional row corresponding to the average of the values of the above-mentioned rows, and an additional column corresponding to the average of the values of the above-mentioned columns.

6. An exhaust gas recirculation (EGR) control method for an internal combustion engine comprising the steps of:

arranging in a memory device comprising a plurality of addresses capable of holding N bits of information each a plurality of instructions comprising n bits of information, n being less than half of N, at least two instructions being arranged according to corresponding bit arrangements in each address and each address corresponding to a range of combinations of at least two engine operating parameters;

measuring at least two engine operating parameters pertinent to exhaust gas recirculation;

retrieving the instructions from the memory address corresponding to the combination of the measured engine parameters;

deriving one of said retrieved instructions by means of the corresponding bit arrangement selected in accordance with the relationship between the combination of the measured parameters and the range of combinations corresponding to the address from which said instructions were retrieved; and controlling the flow of atmospheric air and of exhaust into the engine in accordance with the derived instruction.

7. The method of claim 6, wherein a throttle valve can be actuated to either a fully-open position or a partially-open position to regulate atmospheric air flow into the engine and an EGR valve can be actuated to either a fully-open position or a partially-open position to regulate exhaust gas flow into the engine, and wherein each of said instructions comprises two bits specifying one of the four possible combinations of positions of said valves.

8. The method of claim 6, wherein engine revolution speed and engine load are measured as the engine operating parameters in said measuring step.

* * * * *